United States Patent [19]

Junginger et al.

[11] Patent Number: 4,638,228
[45] Date of Patent: Jan. 20, 1987

[54] DIGITALLY CONTROLLED ANALOG OPERATING CONTROL SYSTEM, AND METHOD

[75] Inventors: Erich Junginger, Stuttgart; Eberhard Schnaibel, Hemmingen; Erich Schneider, Kirchheim, all of Fed. Rep. of Germany

[73] Assignee: Robert Bosch GmbH, Stuttgart, Fed. Rep. of Germany

[21] Appl. No.: 764,882

[22] Filed: Aug. 12, 1985

[30] Foreign Application Priority Data

Aug. 16, 1984 [DE] Fed. Rep. of Germany ....... 3430078
Jul. 25, 1985 [DE] Fed. Rep. of Germany ....... 3526620

[51] Int. Cl.⁴ ............................................. G05B 19/18
[52] U.S. Cl. .............................. 318/569; 340/347 DA
[58] Field of Search ......... 318/569; 340/340, 347 DA

[56] References Cited

U.S. PATENT DOCUMENTS 3,987,436  10/1976  Candy et al. ................ 340/347 DA

FOREIGN PATENT DOCUMENTS 3130099  5/1983  Fed. Rep. of Germany .

OTHER PUBLICATIONS

Seitzer et al., "Electronic Analog-to-Digital Converter", pp. 58–61; 105, John Wiley and Sons.

*Primary Examiner*—William M. Shoop, Jr.
*Assistant Examiner*—Saul M. Bergmann
*Attorney, Agent, or Firm*—Frishauf, Holtz, Goodman & Woodward

[57] ABSTRACT

To increase the resolution of digital words, for example eight-bit words, being supplied via a digital/analog (D/A) converter (2) to a closed control loop, the lowest-order bit (2a) is chopped with a duty cycle, that is, controlled pulse duration/pulse gap ratio, for accurate resolution of the entire word being transmitted. The D/A converter will provide an output of undulating or wavy form, which undulations or waves are averaged or integrated by a low-pass filter (5) or low-pass transmission characteristics of a controller (6) or the overall control loop (4-6-7-8-9-10-11-4) to which the analog signal is applied as a command signal. The system is particularly suitable for accurate control of a fuel supply control element, such as a throttle (9), in the induction pipe of an internal combustion engine using only eight-bit command words, by not transmitting the lowest-order bit in steady-state form but, rather, chopped with controlled duty cycle for conversion of the chopping effect into analog form in the D/A converter (2). The repetition frequency of the pulse duration modulation is suppressed by the low-pass filter or filter characteristics of the control loop.

5 Claims, 2 Drawing Figures

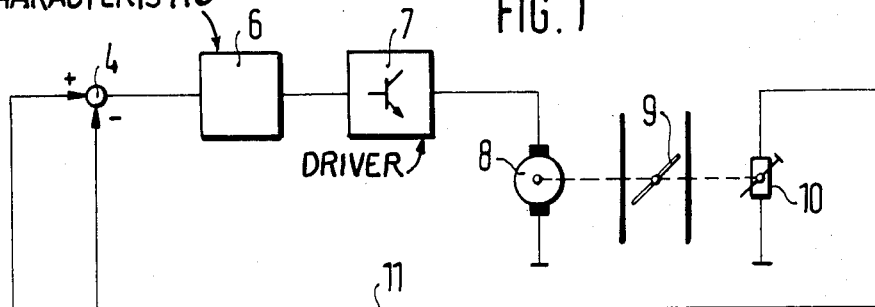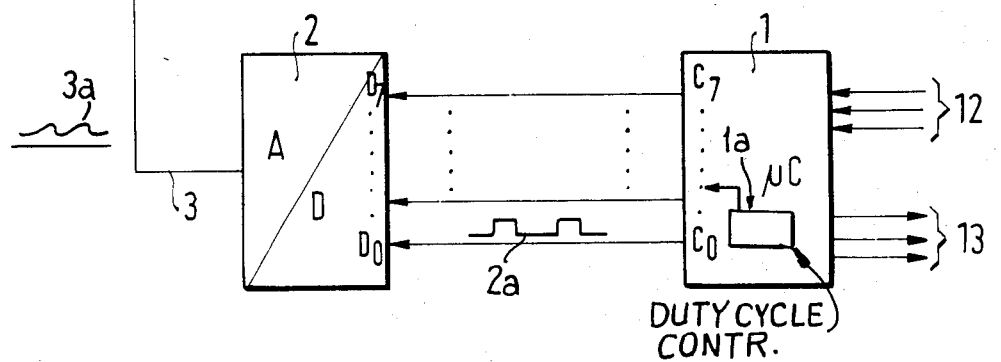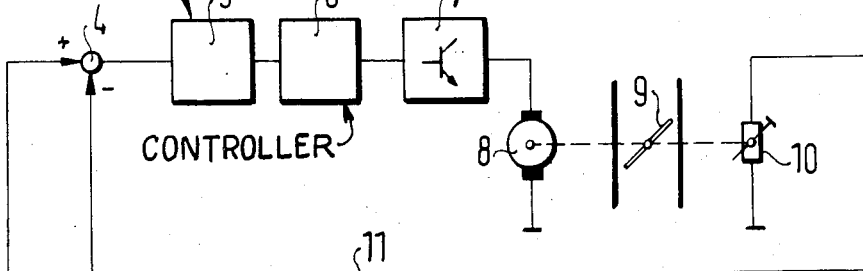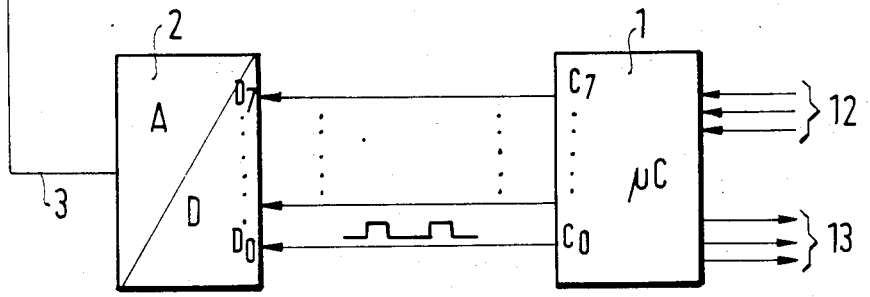

DIGITALLY CONTROLLED ANALOG OPERATING CONTROL SYSTEM, AND METHOD

Reference to related applications, assigned to the assignee of the present invention, the disclosure of which is hereby incorporated by reference: U.S. Ser. No. 760,124, filed July 29, 1985 and now allowed, JUNGINGER et al claiming priority German Applns. Pat. No. 34 30 076.7 of Aug. 16, 1984 and Pat. No. 35 10 176.8 of Mar. 21, 1985 U.S. Ser. No. 760,126, filed July 29, 1985 and now allowed, JUNGINGER et al claiming priority of German Applications Pat. No.34 30 077.5, Aug. 16,1984 and and Pat. No. 35 10 173.3 of Mar. 21, 1985; German Patent Disclosure Document No. DE-OS No. 31 09 638, to which European Patent Application No. 0 060 326 corresponds. U.S. Pat. No. 4,495,454 (to which German Pat. No. DE-OS 31 30 099 corresponds).

The present invention relates to a control system and to a control method, and more particularly to a control system to control a positioning or servo motor in a closed control loop based on digital command data which are converted into analog form in a digital-/analog (D/A) converter.

BACKGROUND

It has previously been proposed to control the position of a throttle or other similar fuel control element by a servo motor, see, for example, the referenced U.S. Pat. No. 4,495,454. The position of a throttle flap, to a predetermined opening cross section of the induction pipe, can be controlled by suitably energizing a servo or other positioning motor based on a command signal. The command signal can be in digital form, that is, can be a digital command word which is transformed into an analog command value in a D/A converter. The command signal is then applied to a comparator which compares the command signal with an actual position signal derived from a position transducer and, for example, coupled to the servo motor or other positioning motor and/or to the positioned element, for example the throttle or other fuel supply controller. The actual position signal derived from the positioning transducer thus will be a measure of fuel being supplied and, under given operating conditions, of a certain speed of the motor. This actual signal value is compared in the comparator with the command signal value. The D/A converter usually is controlled, in turn, by a register or counter which, of course, may form part of a microcomputer or an equivalent functional stage within a microcomputer, or externally thereof.

The resolution which is obtainable by a D/A converter depends on the resolution of the digital command word. In order to obtain higher resolution, a D/A converter is needed which is capable of handling digital command words having a high number of bits. This, in turn, requires a control counter for the D/A converter, in, or externally of the microcomputer. Controlling the D/A converter with command words having a large number of bits is expensive and requires substantial circuit components; the complexity of such circuits may lead, additionally, to an increased possibility of malfunction. Further, in many automotive control systems it is customary to use command words of eight bits and, to obtain higher resolution, it is necessary to include additional circuitry if a higher resolution of command words is needed.

THE INVENTION

It is an object to provide a control system, and more particularly a control system for use in an automotive vehicle, especially to position a fuel control element therein, in which the supply of a reference or command signal to an analog comparator utilizes a D/A converter in which a control resolution is obtained which is greater than that provided by the bit-width of the D/A converter, and which is greater than the resolution of the D/A converter based on the predetermined number of bits supplied thereto.

Briefly, the lowest-order bit is not transmitted as a steady-state value but, rather, is chopped with a predetermined duty cycle, or, in other words, ratio of pulse duration to pulse gap of the chopped bit, in order to increase the resolution of the analog output. The digital-/analog converter will then provide an analog output value which will be wavy or undulating, in which the energy of the undulating output signal will be representative of the pulse duration - pulse gap ratio, or duty cycle, of the chopped lowest-order bit. The resulting waviness, based on the chopping frequency, is filtered in low-pass characteristics of the control loop which includes the positioning motor or positioned element, for example by inherent low-pass characteristics of the circuitry of the control loop or by a low-pass filter.

The output from the D/A converter is applied as a command value to a servo control loop. The system and method permits any desired resolution of the command value because the level associated with the lowest-order bit will be changed, as desired, by averaging the pulse-type output of the lowest-order bit. Resolution of the value, thus, is obtained with a D/A converter of minimum cost.

The system has the advantage that the D/A converter which forms a portion of the control loop anyway can be used in which the number of bits to be converted is as before, and as in accordance with the prior art—for example eight bits per word. The quantitizing resolution of the D/A converter thus need not be changed. The lowest-order bit signal, however, is not a stationary value applied to the D/A converter but, rather, is applied in pulses with controlled duty cycle or duty ratio; the resulting waviness of the converted analog signal is averaged by a low-pass characteristic of the circuit or of the filter of the closed control loop, and the waviness, thus, is converted into an analog value representative of the duty cycle. Consequently, the control loop will receive a command signal in analog form - for comparison with a then existing actual value - also in analog form. The digital resolution requirement of the D/A converter, however, is substantially below that of the resolution actually achieved.

The low-pass characteristic of the circuit need not require any additional components since various transmission and transfer circuits in such servo systems already have low-pass characteristic. The low-pass characteristic, thus,is utilized in dual manner, once to prevent hunting and overshoot of the control loop and, further, to average the ripple component of the output signal from the D/A converter.

DRAWINGS

FIG. 1 is a highly schematic block diagram of the system of the present invention, illustrating a first embodiment, and also showing wave forms of signals occurring in the system; and FIG. 2 is a diagram similar to FIG. 1 and illustrating another embodiment, in which elements similar to those in FIG. 1 have been given the same reference numerals, and, if changed, with prime notation.

DETAILED DESCRIPTION

The invention will be described in connection with an automotive-type internal combustion engine (ICE) of the Otto engine type, in which a throttle controls the fuel supply.

A digitally operating control unit 1, which may be a microprocessor or microcomputer, receives input signals through a plurality of inputs 12 relating to operating parameters of the vehicle. The computer receives these input signals, for example engine speed, vehicle speed, engine temperature, control signals reflecting operator decisions such as position of a fuel controller and the like. In dependence on the structure of the microcomputer, output signals are derived, available at outputs 13, for example controlling the ignition timing of the engine and the like. One additional group of output signals is available at output terminals $C_0$ to $C_7$ in which command signals in parallel, digital form are available to provide digital command words to inputs $D_0$ to $D_7$ of a digital/analog (D/A) converter 2. The analog output 3 from the D/A converter 2 is available as an analog command signal and applied to a difference or comparator stage 4 of a closed control loop. The closed control loop positions the throttle 9 in the induction pipe of the vehicle, to control the fuel-air mixture to be applied to an engine (not shown). The throttle 9 is positioned by a servo motor 8. The mechanical drive between the motor 8 and the throttle 9 is further coupled to a position sensor 10, for example a potentiometer, which provides an actual position output signal over a line 11 to the negative or comparison input of the comparator 4. The comparator 4 then provides a positioning error or difference signal in the closed control loop to a controller 6 which, in turn, controls a driver stage 7 for operation of the servo motor 8.

FIG. 1, further, shows that the digital command word which forms the command value for the control loop, is available as an eight-bit word, in parallel form, at the terminals $C_0$ to $C_7$ from the microprocessor 1, and applied, as such, to the digital inputs $D_0$ to $D_7$ of the D/A converter. The signal in the lowest-order bit, derived from the output $C_0$ of the computer 1 and applied to the input $D_0$ of the D/A converter, does not provide a stationary state ZERO or ONE as the 0 bit signal. In accordance with the present invention, this bit is provided in pulsed or chopped form in which the duty cycle is controlled in accordance with control derived from internal signals of the microprocessor 1. A duty cycle control element 1a which, for example, is capable of resolving an output command derived, for example, upon calculation of parameters from, the input signals applied by input lines 12, controls the $D_0$ output line. The resulting signal at the lowest-order bit is shown at 2a. At the analog output 3 of the D/A converter, this pulse at the lowest-order input $D_0$ of the D/A converter will result in a ripple component within the natural quantitizing width of the D/A converter 2, as illustrated by the wave 3a adjacent the output line 3 from the D/A converter. This waviness or undulation of the analog command value, applied to the positive input of the comparator 4, that is, to the input of the closed control loop 4-6-7-8-9-10-4, is transferred to the comparator 4 and through the comparator 4 to form a difference signal. By suitable construction of the closed control loop to have a low-pass characteristic, the repetition frequency, that is, the pulse duration modulation of the lowest-order bit at the output $C_0$ of the computer, will be matched to the operating frequency of the control loop such that suitable damping is obtained and the output frequency is averaged to result in an essentially steady average level representative of the duty cycle of the signal 2a and 3a, respectively.

In accordance with a feature of the invention, one or more of the elements in the closed control loop may operate to provide this low-pass characteristic. For example, the controller 6 may, inherently, have a low-pass characteristic.

The duty cycle or pulse width—pulse gap relationship of the bit transmitted at the lowest order from the microprocessor 1 to the input $D_0$ of the D/A converter can thus resolve the bit signal to any desired command value of the position of the throttle 9 with highest accuracy or resolution—and substantially more than it would be capable of by quantitizing the digital output from the microprocessor 1 and providing all bits in stationary form to the D/A converter.

In accordance with a preferred feature of the invention, the controller 6, inherently, has a low-pass characteristic, so that, by suitable design of the controller, no additional circuit components are needed.

Embodiment of FIG. 2: The control system is effectively identical to that of FIG. 1, with the exception that the controller 6' need not have low-pass characteristic and that an additional, separate low-pass filter 5 is interposed between the comparator 4 and the controller 6'. The low-pass filter 5 can be inserted in the closed control loop at any desired circuit position; it is shown, between the comparator 4 and the controller 6 in a preferred position.

The low-pass characteristic of the closed control loop can be used not only to suppress the modulation frequency of the pulse duration modulation 2a of the lowest-order bit, but may additionally be used—and usually is present already—to suppress transient interference or disturbance signals within the closed control loop. Thus, except for the duty cycle controller 1a, which provides for an increased resolution, no additional circuit components, usually, will be required, although the resolution of positioning of the throttle 9 as a function of a digital command word is substantially enhanced over that when transmitting only stationary 8-bit values.

The invention is equally applicable to Diesel ICEs in which, then, the throttle 9 would be replaced by a Diesel fuel quantity injection controller and the illustration of the throttle 9 is to be deemed to show, schematically, any kind of fuel supply control element.

We claim:

1. In combination with a fuel supply control element (9) of an internal combustion engine of a motor vehicle, a high-resolution control system, for controlling positioning of said element (9), having means (12) for receiving digital control signals;
computer means (1) for processing the digital control signals in accordance with a predetermined program, and providing digital command signals in n-bit parallel digital form;
a digital/analog converter (2) receiving the digital command signals and providing an analog command signal;

a positioning means (8) mechanically coupled to said control element (9) and controlling the position thereof;

an analog control loop including a position transducer (10) sensing the actual position of the positioned control element (9) and providing as actual position signal, a controller (6) controlling the positioning means (8) and providing a position control signal, and a comparator (4) connected to and comparing the actual position signal with the analog command signal derived from the digital/analog converter, and providing a deviation signal to the controller (6) for controlling the positioning means (8), and comprising, in accordance with the invention, means for providing a resolution of more than $2^n$ levels in said position control signal, including means (1a) chopping at least the lowest-order bit ($D_0$) of said digital command signal at a predetermined modulation frequency into a sequence of pulses in which the duty cycle, or pulse-duration/pulse-gap ratio, is adjustable to correspond to a desired position control signal level and hence a desired position setting of said fuel supply control element (9), and low-pass filter means (5; 6) filtering said predetermined modulation frequency from the output from the digital/analog converter to derive an analog value representative of the pulse energy applied to the digital/analog converter at the lowest-order bit in accordance with the pulse-duration/pulse-gap ratio being transmitted thereto by the computer means (1).

2. Control system according to claim 1, wherein the control loop (4-6-7-8-9-10-11-4; 4-5-6'-7-8-9-10-11-4) is characterized by having low-pass signal transfer characteristics.

3. Control system according to claim 1, wherein (FIG. 2) the control loop (4-5-6'-7-8-9-10-11-4) includes a servo positioning motor (8) and a servo controller (6'), and a low-pass filter connected to and providing an output to said controller (6').

4. Control system according to claim 1, wherein the closed loop (4-6-7-8-9-10-11-4) includes a servo positioning motor (8) and a servo controller (6);

and the servo controller includes, inherently, low-pass signal transfer characteristics.

5. The combination of claim 1, wherein the low-pass filter means (5; 6) is connected in said control loop downstream of said comparator means (4) and serves to prevent hunting and overshoot of said control loop for said fuel supply element (9).

* * * * *